United States Patent [19]

Kawatani et al.

[11] Patent Number: 5,291,742
[45] Date of Patent: Mar. 8, 1994

[54] DEODORIZING DEVICE FOR REFRIGERATOR

[75] Inventors: Kenji Kawatani; Kazuaki Taki, both of Ueno, Japan

[73] Assignees: Matsushita Refrigeration Company; Matsushita Electric Industrial Co., Ltd., both of Osaka, Japan

[21] Appl. No.: 849,661

[22] Filed: Mar. 10, 1992

[30] Foreign Application Priority Data

Mar. 11, 1991 [JP] Japan ............... 3-044755
Sep. 20, 1991 [JP] Japan ............... 3-241042

[51] Int. Cl.⁵ .................................. F24F 3/16
[52] U.S. Cl. ........................... 62/78; 422/125
[58] Field of Search ............. 62/78; 422/122, 125, 422/4, 5

[56] References Cited

U.S. PATENT DOCUMENTS

| | | |
|---|---|---|
| 3,658,724 | 4/1972 | Stiles . |
| 3,799,250 | 3/1974 | Dyre . |
| 4,948,567 | 8/1990 | Atarashiya ............ 62/78 X |
| 4,955,208 | 9/1990 | Kawashima et al. ...... 62/78 X |
| 4,965,490 | 10/1990 | Ratner ............... 422/125 X |

FOREIGN PATENT DOCUMENTS

| | | | |
|---|---|---|---|
| 56-72186 | 6/1981 | Japan . | |
| 0010082 | 1/1990 | Japan ................ | 62/78 |
| 0097882 | 4/1990 | Japan ................ | 62/78 |
| 2233978 | 9/1990 | Japan ................ | 62/78 |
| 0254279 | 10/1990 | Japan ................ | 62/78 |
| 0254281 | 10/1990 | Japan ................ | 62/78 |
| 0275277 | 11/1990 | Japan ................ | 62/78 |
| 3036483 | 2/1991 | Japan ................ | 62/78 |

Primary Examiner—Henry A. Bennett
Assistant Examiner—Christopher Kilner
Attorney, Agent, or Firm—Wenderoth, Lind & Ponack

[57] ABSTRACT

A deodorizing device is provided in a refrigerator. This device includes a tubular heater and a water droplet prevention member provided above the heater. The deodorizing heater is provided in an air circulation path and below a cooling coil. On the outer periphery of the heating portion of the heater, there is provided a catalyst coat layer for absorbing odor components. The water droplet prevention member is disposed immediately above the tubular heater so as to cover the heater to prevent water droplets falling from the cooling coil, defrosted by the heater, from falling thereon. When the heater is heated, the catalyst coat layer is heated directly by the heater, and the odor components having been absorbed therein are efficiently decomposed. The heat from the heater heats the cooling coil by convection for effecting defrosting thereof.

12 Claims, 8 Drawing Sheets

DEODORIZING DEVICE FOR REFRIGERATOR

BACKGROUND OF THE INVENTION

1. Field of the Invention

The present invention relates generally to a deodorizing device, and more particularly, to a deodorizing device having the function of removing odor components from within a refrigerator.

2. Description of the Related Art

Within the refrigerator, odors are issued from various food articles such as fish, meat, vegetables, etc., and odors are accumulated because of the circulation in the sealed space, and further adhere to food articles, resulting in the deterioration of the quality of food articles.

For solution of these problems, there has been proposed a deodorizing device for the refrigerator such as described in Japanese Laid-open Patent Publication No. 2-194816.

A conventional deodorizing device for the refrigerator will be described below.

Figure 1:
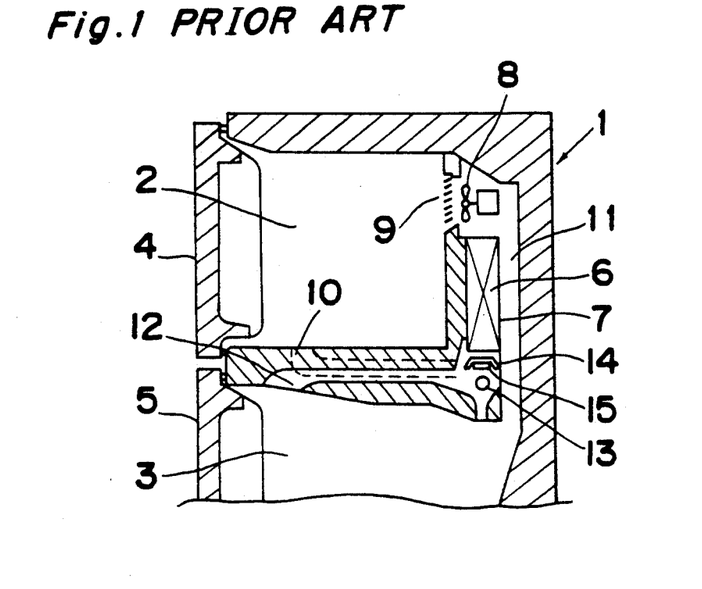
FIG. 1 is a longitudinal sectional view of an upper portion of a refrigerator showing the state where a conventional deodorizing device is installed therein.
Figure 2:
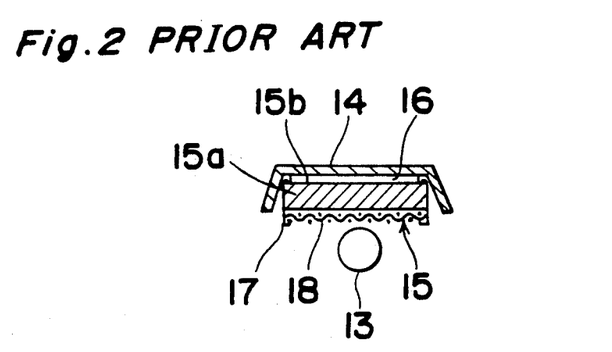
FIGS. 2 and 3 are, respectively, an enlarged cross-section and an enlarged sectional front view of a deodorizing device.

FIG. 1 is a longitudinal sectional view of an upper portion of a refrigerator showing a state wherein the conventional deodorizing device is arranged in the refrigerator. FIG. 2 is an enlarged cross-sectional view of the deodorizing device and FIG. 3 is an enlarged partially broken side view thereof.

First in FIG. 1, there are shown a refrigerator main body 1, a freezing chamber 2 and a cold storage chamber 3 formed therein with respective doors 4 and 5. A cooling coil 6 is arranged in a cooling coil chamber 7 positioned at the back side of said freezing camber 2, and a fan 8 is arranged above the cooling coil 6. When the fan 8 is driven, the freezing chamber 2 is cooled by the air circulation, wherein part of the air cooled by the cooling coil 6 is supplied into the freezing chamber 2 from a supply port 9, and the air within the freezing chamber 2 is returned to the cooling coil chamber 7 through a return duct 10.

Meanwhile, the cold storage chamber 3 is cooled by the air circulation, wherein part of the air cooled by the cooling coil 6 is supplied into the cold storage chamber 3 through a supply duct 11, and the air therein is returned to the cooling coil chamber 7 through a return duct 12. In this case, the cooling coil chamber 7, the freezing chamber 2 and the return duct 10 constitute the circulation path for circulating the air within the freezing chamber 2, while the cooling coil chamber 7, the supply duct 11, the cold storage chamber 3 and the return duct 12 constitute the circulation path for circulating the air within the cold storage chamber 3.

Figure 3:
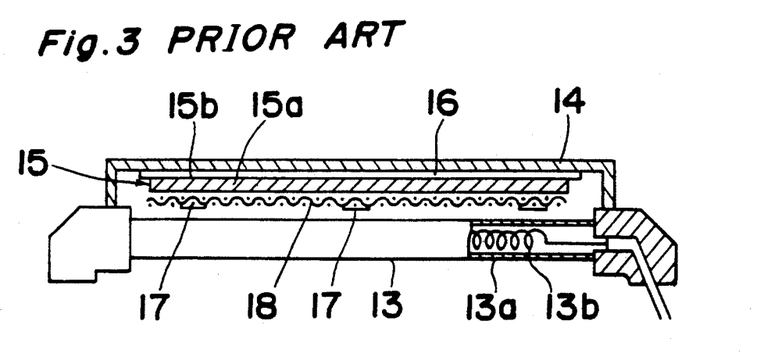

Reference numeral 13 represents a defrosting heater provided under the cooling coil 6 in the lower portion of the cooling coil chamber 7, constituted by a glass tube heater wherein a heating wire 13b is provided in a glass tube 13a as shown in FIG. 3. The defrosting heater 13 is on-off controlled so as to be energized only in defrosting the cooling coil 6, and to otherwise to be cut off. Reference numeral 14 represents a water droplet prevention member provided so as to cover the defrosting heater 13 from above, which is made of a metallic plate, for example heat-resistant and water-resistant aluminum or the like, and formed in the shape of a downward opened shallow-bottomed container, as shown also in FIG. 2, for preventing the defrosted water from falling on the defrosting heater 13 during the defrosting cycle.

Reference numeral 15 represents a deodorizing member, which is of a two-layered structure comprised of a adsorption agent layer 15a made of adsorbing agent such as silica (silicon dioxide) or the like and a catalyst layer 15b made of platinum nickel or the like, provided on the adsorption agent layer 15a. Here, the adsorption member 15 is formed by forming the plate-shaped adsorption agent layer 15a through sintering the adsorption agent, applying the catalyst on its surface through immersing the adsorption agent layer 15a into the catalyst solution, and thereafter subjecting the same to heat treatment for forming the catalyst layer 15b on the surface of the adsorption agent layer 15a.

Furthermore, the adsorption agent layer 15a and catalyst layer 15b are respectively of porous structures so as allow air to pass therethrough. The deodorizing member 15 is supported and fixed on the inner face of the water droplet prevention member 14 by support fittings 17 through an insulation member 16 made of glass fiber or the like, thus positioned above and near said defrosting heater 13.

Reference numeral 18 indicates a cover member, for example a metallic net formed so as to have a large number of through holes, made of a high heat conductivity material and provided so as to cover the surface of the deodorizing member 15.

With respect to the deodorizing device for the refrigerator constituted as described above, the operation will be described below.

In the above structure, during the cooling cycle, the air within the refrigerator is circulated by the fan 8 through the cooling coil chamber 7, the freezing chamber 2 and the return duct 10 and through the cooling coil chamber 7 the supply duct 11, the cold storage chamber 3 and the return duct 12. In this case, the air passing through the cooling coil chamber 7 contacts the deodorizing member 15 through the through holes of the metallic net so that the odor components contained in the air is adsorbed by the adsorption agent layer 15a of the deodorizing member 15.

On the other hand, when the defrosting cycle is started, the operation of the cooling coil 6 and the fan 8 is stopped, while the defrosting heater 13 is energized to be heated. By the heating of the defrosting heater 13, the cooling coil 6 is heated so as to be defrosted, and simultaneously the deodorizing member 15 is heated. In this case, since the surface of the deodorizing member 15 is covered by the metallic net 18, by the heat conduction of this metallic net 18 the deodorizing member 15 is heated as uniformly as possible. In the heated deodorizing member 15, the odor components adsorbed by the adsorption agent layer 15a are decomposed and released, and at the same time, the odor components are decomposed and removed through oxidization in the catalyst layer 15b.

Thus, in the deodorizing member 15, the adsorption function, that is, the deodorizing function is regenerated by heating. In this case, the water droplet prevention member 14 contains the heat from the defrosting heater 13 therebelow and plays the role of efficiently heating the deodorizing member 15 and prevents the defrosted water from the cooling coil 6 from falling on the deodorizing member 15 and the defrosting heater 13.

The insulation member 16 holds the heat discharge of the deodorizing member 15 from the water droplet prevention member 14, and also prevents heat shock of the deodorizing member 15 due to rapid cooling of the water droplet prevention member 14 arising from the defrosted water dropped thereon.

Furthermore, the metallic net 18 prevents the deodorizing member 15 from being scattered and falling when the deodorizing member is broken.

When the defrosting cycle is completed and the cooling cycle is resumed, resulting in the decrease of the temperature of the deodorizing member 15, as described above, the odor components contained in the air within the refrigerator are adsorbed by the deodorizing member 15 to thereby be removed.

In the above constitution, however, besides the water droplet prevention member 14, the deodorizing member 15, the insulation member 16, the support fittings 17 and the metallic net 18 intervene between the defrosting heater 13 and the cooling coil 6, resulting in a complicated structure.

Furthermore, as a result, it is necessary to increase the thickness and size of the water droplet prevention member 14 for holding the deodorizing member 15, and also necessary to reduce the distance between the defrosting heater 13 and the water droplet prevention member 14 for raising the temperature of the deodorizing member 15. From the above, the linear radiation heat from the defrosting heater 13 and the rise of the convection heat to the cooling coil 6 are hampered, resulting in such a disadvantage that the defrosting time is increased and the defrosting performance of the refrigerator is lowered.

Furthermore, due to the fact that one face of the deodorizing member is in contact with the insulation member 16, the metallic net 18 covers the surface of the deodorizing member 15 and the water droplet prevention member 14 is required to be increased in size, there is such a disadvantage that the circulated air flow hitting the deodorizing member 15 is poor, resulting in a lowered deodorizing effect.

SUMMARY OF THE INVENTION

In order to solve the above-described problem, according to the present invention, there is provided a deodorizing device for the refrigerator comprising a tubular heater disposed in an air circulation path and below a cooling coil and provided with a catalyst coat layer for adsorbing odor components on an outer periphery of a heating portion thereof in order to adsorb the odor components of air within the refrigerator and also to effect defrosting of the cooling coil. A water droplet prevention member is positioned right above the tubular heater so as to cover the same for preventing water droplets from falling on the tubular heater when it is defrosted by the tubular heater.

According to the above-described construction, since the catalyst coating layer adsorbing the odor components is provided directly on the tubular heater, the device becomes simplified in structure. And when the tubular heater is heated, the catalyst coating layer is immediately heated and the odor components having been adsorbed therein are securely decomposed. Therefore, there is no need to dispose the heater extremely close to the water droplet prevention member as in the conventional device and for this reason, a suitable distance can be secured between the tubular heater and the water droplet prevention member so as to secure the convection of the radiation heat from the heater, and the catalyst coating layer on the periphery of the heater is readily exposed to the circulated air within the refrigerator, resulting in an improvement of the deodorizing effect.

BRIEF DESCRIPTION OF THE DRAWINGS

These and other objects and features of the present invention will become clear from the following description, taken in conjunction with the preferred embodiments thereof and with reference to the accompanying drawings throughout which like parts are designated by like reference numerals, and in which.

DETAILED DESCRIPTION OF THE PREFERRED EMBODIMENTS

Hereinbelow, preferred embodiments of the present invention will be described with reference to the accompanying drawings.

First Embodiment

Figure 4:
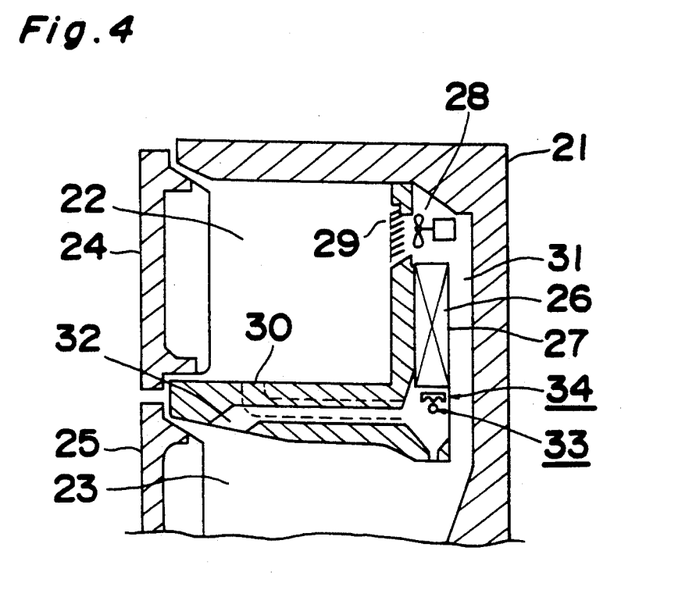
FIG. 4 is a longitudinal sectional view showing the state where a deodorizing device according to a first embodiment of the present invent is installed in a refrigerator.
Figure 5:
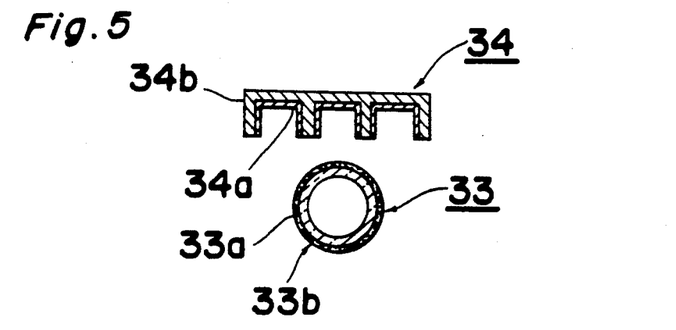
FIGS. 5 and 6 are, respectively, an enlarged cross-section and a partially broken side view of the deodorizing device shown in FIG. 4.
Figure 6:
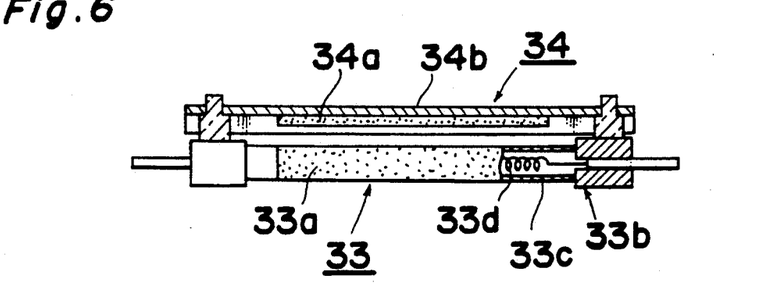

FIG. 4 is a longitudinal sectional view of the upper portion of a refrigerator provided with a deodorizing device according to a first preferred embodiment of the present invention, while FIGS. 5 and 6 are, respectively, an enlarged cross-sectional view and an enlarged partially broken side view of the deodorizing device.

In FIG. 4, there are shown a refrigerator main body 21 and a freezing chamber 22 and a cold storage chamber 23 formed therein, provided with respective doors 24 and 25 thereon. A cooling coil 26 is provided in the cooling coil chamber 27 in the back side of the freezing chamber 22, and a fan 28 is provided above the cooling coil 26. When the fan 28 is driven, the freezing chamber 22 is cooled down by air circulation, wherein part of the air cooled by the cooling coil 26 is fed to the freezing chamber 22, and the air within the freezing chamber 22 is returned to the cooling coil chamber 27 through a return duct 30.

Meanwhile, the cold storage chamber 23 is cooled down by air circulation, wherein part of the air cooled by the cooling coil 26 is fed to the cold storage chamber 23 through a supply duct 31, and the air within the cold storage chamber 23 is returned to the cooling coil chamber 27 through a return duct 32. In this case, the cooling coil chamber 27, the freezing chamber 22 and the return duct 30 constitute a circulation path through which the air within the freezing chamber 22 is circulated, and the cooling coil chamber 27, the supply duct 31, the cold storage chamber 23 and the return duct 32 constitute a circulation path through which the air within the cold storage chamber 2 is circulated.

There is provided a deodorizing heater 33 arranged below the cooling coil 26 in the lower portion of the cooling coil chamber 27, which heater is provided with a catalyst coated layer 33a on the surface of the effective heating portion of a tubular heater 33b, with an electric resistance wire 33d provided within a glass tube 33c, as shown in FIGS. 5 and 6.

Furthermore, the tubular heater 33b acts also as the defrosting heater of the refrigerator, and is on-off controlled so as to be energized only when defrosting, and is otherwise cut off.

Reference numeral 34 represents a water droplet prevention member provided so as to cover the deodorizing heater 33 from above, as shown in FIGS. 5 and 6, to prevent the defrosted water from falling onto the deodorizing heater. The member 34 is made of a metallic material 34b such as water-proof and heat resistant aluminum or stainless steel, with its lower surface being formed in a multi-bladed sectional shape and with a catalyst coat layer 34a being formed on its lower surface.

With respect to the deodorizing device for a refrigerator constituted as described above, the operation thereof will be described below.

In the cooling operation the air within the refrigerator is circulated by the fan 28 through the cooling coil chamber 27, the freezing chamber 22 and the return duct 30 and also circulated through the cooling coil camber 27, the supply duct 31, the cold storage chamber 23 and the return duct 32.

In this case, the air containing odor components which passes through the cooling coil chamber 27 contacts the deodorizing heater 33 and the water droplet prevention member 34, whereby the odor components are adsorbed and removed by the catalyst coat layers 33a and 34a.

Subsequently, when the defrosting operation is started, the operation of the cooling coil 26 and the fan 28 is stopped and, on the other hand, the deodorizing heater 33 is energized to be heated. Since the catalyst coat layer 33a of the deodorizing heater 33 is provided so as to cover the outer periphery of the glass tube 33c, the layer is efficiently radiation-heated by heat rays emitted in the entire peripheral directions from the electric resistance wire 33d so as to reach its activation temperature in a short time, thereby raising the deodorizing heater to a high temperature.

In this case, the odor components adsorbed by the catalyst coat layer 33a of the deodorizing heater 33 are released by the heating of the catalyst coated layer up to the activation temperature and, at the same time, deodorized through oxidizing decomposition by the chemical action of the catalyst material. Thereby, the adsorption capability of the catalyst coated layer is regenerated.

On the other hand, since nothing intervenes between the water droplet prevention member 34 and the catalyst coat layer 34a and the water droplet prevention member 34 is not required to hold any intervening material and can be downsized, the water droplet prevention member 34 receives the radiation heat from the deodorizing heater 33 efficiently so as to be heated up to the activation temperature, whereby the odor components adsorbed are released and, at the same time, deodorized by the catalyst action, and the adsorbing capability of the catalyst coat layer 34a is regenerated.

Furthermore, due to the fact that nothing intervenes between the deodorizing heater 33 and the water droplet prevention member 34, the circulating air within the chambers containing odor components hits the catalyst coat layers 33a and 34a efficiently, and since the water droplet prevention member 34 is of a multi-bladed shape, the surface area of the catalyst coat layer 35a is increased to improve the adsorbing capability, thereby further raising the deodorizing effect. From the above, adsorption of odor components is effected efficiently.

In addition, the catalyst coat layers 33a and 34a are of thin porous layers coated, for example, by a spray method, and can be easily raised in temperature up to the activation temperature.

From the above, it becomes possible to make the distance between the deodorizing heater 33 and the water droplet prevention member comparatively large, and thereby the hindrance of linear radiation heat from the deodorizing heater 33 and the rise of convection heat to the cooling coil 26 is decreased. Accordingly, an increase in the defrosting time can be suppressed to prevent a decrease in the defrosting performance of the refrigerator.

Second Embodiment

Figure 7:
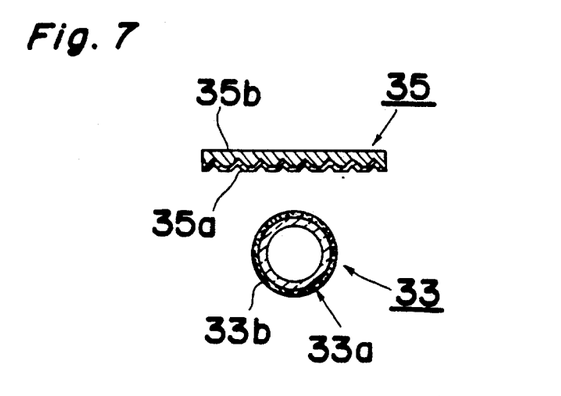
FIG. 7 is an enlarged cross-sectional view of a deodorizing device according to a second embodiment of the present invention.

Meanwhile, FIG. 7 is an enlarged cross-sectional view of a deodorizing device according to a second preferred embodiment of the present invention, which includes a deodorizing heater 33 having a catalyst coated layer 33a provided on the effective heating surface of a tubular heater 33b.

Reference numeral 35 represents a water droplet prevention member provided so as to cover the deodorizing heater 33 from above to prevent the defrosting water from falling onto the deodorizing heater having a wave-shaped or saw-tooth sectional shape on its lower surface, and a catalyst coated layer 35a coated on the surface of metallic material 35b, such as heat-resistant and water-proof aluminum or stainless steel. The operation and effect, thereof is the same as that of the first embodiment above.

Third Embodiment

Figure 8:
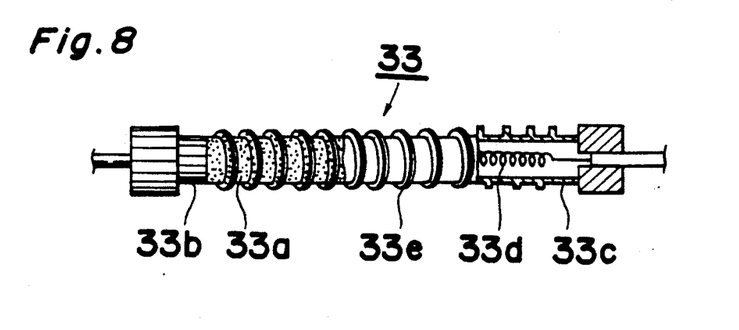
FIG. 8 is an enlarged, partially broken side view of a deodorizing device according to a third embodiment of the present invention.

FIG. 8 is an enlarged partially broken side view of a deodorizing device according to a third preferred embodiment of the present invention, which includes a tubular heater 33b with an electric resistance wire 33d provided within a glass tube 33c. A fin 33e is made of a comparatively good heat conductance material, such as aluminum having arranged around its circular surface, in a spiral, a catalyst coated layer 33a, formed, for example, by the spray method on the fin 33e, the surface corresponding to the effective heating portion of the tubular heater 33b. Furthermore, the tubular heater 33b also acts as the defrosting heater of the refrigerator and is on-off controlled so as to be energized in defrosting and to otherwise be cut off.

With respect to the operation of the deodorizing device constituted as described above, the points different from the foregoing embodiment are primarily described, with other details being omitted.

During the cooling operation, the air within the refrigerator is circulated by a fan 28 and the air containing odor components becomes into contact with the deodorizing heater 33 so as to remove the odor components by the adsorption of the catalyst coated layer 33a.

Subsequently, when the defrosting operation is started, the operation of the cooling coil 26 and the fan 28 is stopped and, on the other hand, the deodorizing heater 33 is energized to be heated. In this case, the odor components having been adsorbed by the catalyst coated layer 33a are released by the heating of the catalyst coated layer 33a up to the activation temperature and at the same time, deodorized through the oxidizing composition by the chemical action of the catalyst material so as to regenerate the adsorption capability.

In this case, since the fin 33e is arranged spirally around the surface of the tubular heater 33b, the surface area of the catalyst coated layer 35a is increased so as to improve the adsorption capability, and since the fin 33e is made of a comparatively good heat conductance material such as aluminum, the catalyst coated layer 33a can be raised up to the activation temperature in a short time so as to further raise the deodorizing effect.

Although the fin 33e is arranged spirally in the present embodiment, it may be replaced by a metallic wire.

Fourth Embodiment

Figure 9:
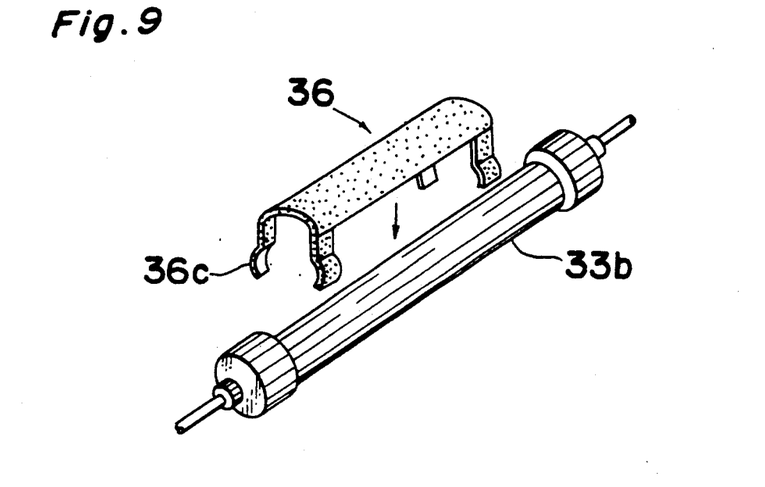
FIGS. 9 and 10 are, respectively, an exploded perspective view and an enlarged cross-sectional view of an essential portion of a deodorizing device according to a fourth embodiment of the present invention.
Figure 10:
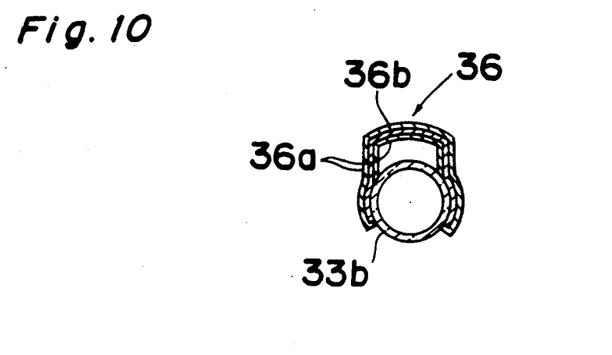

Furthermore, FIG. 9 is a dismantled perspective view of a deodorizing heater according to a fourth preferred embodiment of the present invention, and FIG. 10 is a sectional view of an the essential portion thereof.

In FIGS. 9 and 10, reference numeral 36 represents a deodorizing member and reference numeral 33b represents a tubular heater. The deodorizing member 36 has a catalyst coated layer 36a coated, for example, by the dip coating method on the surface of a substrate 36b made of a comparatively good heat conductance material, and installed on the tubular heater 33b with installation fittings 36c formed so as to be easily mounted thereon. Above the tubular heater 33b provided with the deodorizing member 36 thereon is provided a water droplet prevention.

With respect to the operation of the deodorizing device constituted as described above, the difference from the previous embodiments will be primarily described, with other details being omitted.

During the cooling operation, the air within the refrigerator is circulated by the air supply action of the fan 28 and the air containing odor components contacts the deodorizing member 36 so that the odor components are adsorbed by the catalyst coated layer 36a to be thereby removed.

Subsequently, when the defrosting operation is started, the operation of the cooling coil 26 and the fan 28 is stopped and the tubular heater 33a is energized to heat up the catalyst coated layer 36a. By the heating of the catalyst coated layer 36a up to the activation temperature, the odor components having been adsorbed into the catalyst coated layer 36a of the deodorizing member 36 are released and deodorized through the oxidizing decomposition by the chemical action of the catalyst material, resulting in regeneration of the adsorption capability of the catalyst coated layer 36a.

In this case, since the deodorizing member 36 is in contact with the tubular heater 33b through the installation fittings 36c, in addition to the radiation and convection from the tubular heater 33b, heat transmission is effected also by conduction, and thereby, the heating of the catalyst coated layer 36a can be very effective.

The volume of the catalyst coated layer 36a can thereby be increased, so as to further raise the deodorizing effect.

Furthermore, since the deodorizing member 36 is arranged to be of a mount-on type, the dip coating method becomes possible, and the assembly can be simply effected.

Furthermore, the catalyst coated layers 33a, 34a, 35a and 36a in the respective embodiments, as described above, are formed by using metallic oxides such as manganese dioxide, metallic oxide of perovskite structure, hexa-aluminate, etc. and a catalyst material such as the metal of alumina containing platinum group together with a suitable bonding agent such as aluminum hydroxide, alumina-sol, silica-gel, etc. From the view point of heat resistivity and anti-toxicity, it is the most preferable to use a metal of alumina-platinum group as the material for the catalyst coated layer among these materials.

Furthermore, the catalyst coated layers 33a, 34a, 35a and 36a preferably include silica. By including silica, the catalyst coated layers 33a, 34a, 35a and 36a can be attached firmly to the outer surface of a heating member such as a glass tube.

Fifth Embodiment

Figure 11:
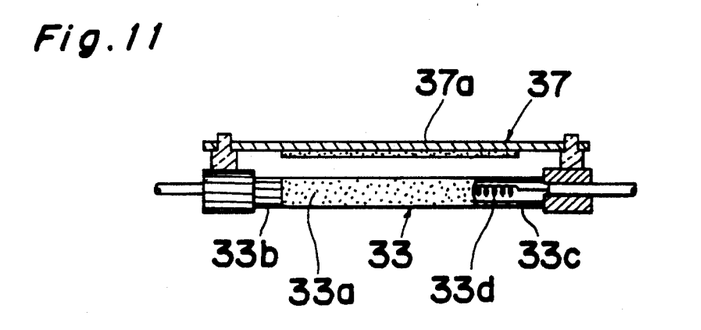
FIGS. 11 and 12 are, respectively a partially broken side view and a perspective view of a deodorizing device according to a fifth embodiment of the present invention.
Figure 12:
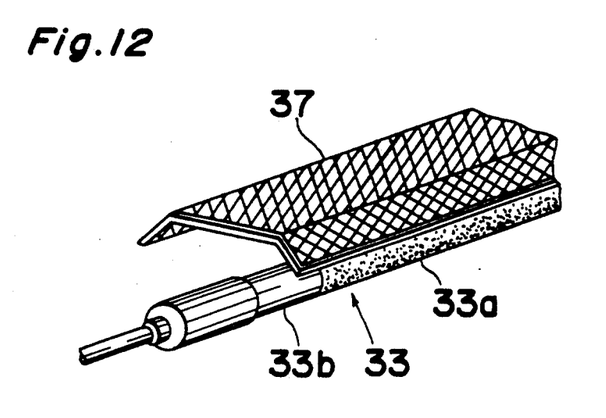

A fifth preferred embodiment of the present invention will be described below with reference to FIGS. 11 through 13. As shown in FIG. 11, a water droplet prevention member 37 is provided so as to cover a deodorizing heater 33 from above so as to prevent the defrosted water from falling directly onto the deodorizing heater 33, and is formed in a net shape by heat resistant stainless steel wires, etc, as shown, for example, in FIG. 12, with a catalyst coated layer 37a being formed thereon. The catalyst coated layer 37a is made of the same ingredients as the above-described catalyst coated layer 34a, etc.

With respect to the deodorizing device constituted as described above, its operation will be described below.

During the cooling operation, the air in the refrigerator is circulated by the air supply action of the fan 28 through the cooling coil chamber 27, the freezing chamber 22 and the return duct 30 and through the cooling coil chamber 27, the supply duct 31 and the return duct 32.

Figure 13:
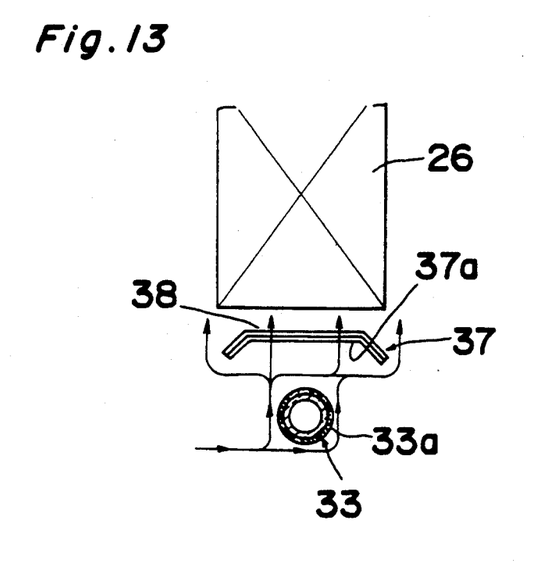
FIG. 13 is a cross-sectional view showing the relation between the deodorizing device shown in FIG. 11 and the cooling coil.

In this case, since the water droplet prevention member 37 is of a net shape, the air passing through the cooling coil chamber 27 becomes air passing through as shown in FIG. 13, so as to efficiently contact the deodorizing heater 33 and the water droplet prevention member 37. The odor components contained in the air are adsorbed and removed by the catalyst coated layers 33a and 37a.

Subsequently, when the defrosting operation is started, the operation of the cooling coil 26 and the fan 28 is stopped, while the deodorizing heater 33 is energized to be heated. Since the catalyst coated layer 33a is provided so as to cover the outer periphery of the glass tube 33c, it is efficiently radiation-heated by the heat rays emitted in the entire peripheral direction from the electric resistance wire 33d so as to be heated up to its activation temperature in a short time, and also the deodorizing heater 33 can be raised to a high temperature.

At this time, the odor components having been adsorbed by the catalyst coat layer 33a are released by the heating of the catalyst coat layer 33a up to the activation temperature, and deodorized through oxidizing decomposition by the chemical action of the catalyst material, and the adsorption capability of the catalyst coated layer 33a is regenerated.

On the other hand, in the catalyst coat layer 37a of the water droplet prevention member 37, the odor components having been adsorbed therein are released through its heating up to the activation temperature by the radiated heat from the deodorizing heater 33 and deodorized by the catalyst action, and thus, the adsorption capability of the catalyst coat layer 37a is regenerated.

Furthermore, since the water droplet prevention member 37 is of a net shape, the linear radiation heat and convection heat from the deodorizing heater 33 pass through the water droplet prevention member 37 so as to be transmitted efficiently to the cooling coil 26, and thereby a decrease in the defrosting performance of the refrigerator can be prevented.

Furthermore, the water droplets falling from the cooling coil 26 during the defrosting cycle are splashed by the impact upon falling on the net-shaped water droplet prevention member 37 and prevented from directly impacting the deodorizing heater 33 so as to avoid issuing an evaporation sound.

Sixth Embodiment

Figure 14:
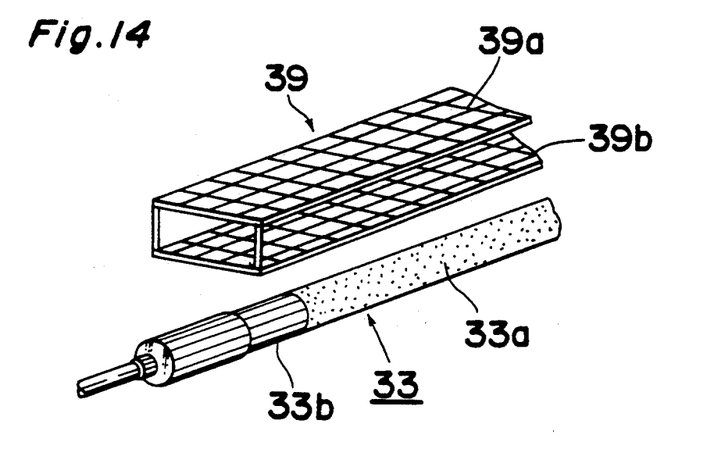
FIG. 14 is a perspective view of an essential portion of a deodorizing device according to a sixth embodiment of the present invention.
Figure 15:
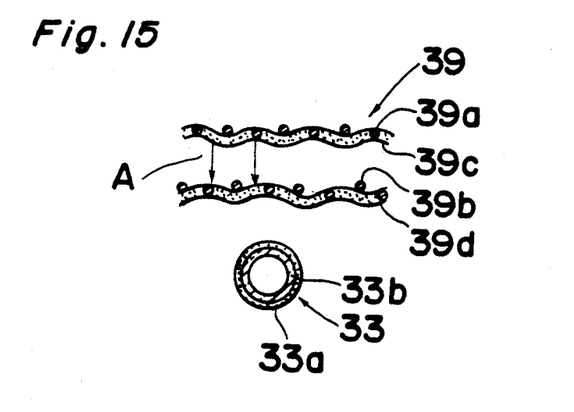
FIG. 15 is an enlarged sectional view of the essential portion of the deodorizing device shown in FIG. 14.

Next, FIG. 14 is an enlarged perspective view of a sixth preferred embodiment of the present invention and FIG. 15 is an enlarged sectional view of an essential portion thereof.

In FIG. 14, reference numeral 33 represents a deodorizing heater having a catalyst coated layer 33a formed on the effective heating surface of the tubular heater 33b, for example by the spray method. Reference numeral 39 indicates a water droplet prevention member provided so as to cover the deodorizing heater 33 from above to prevent the defrosted water from directly falling onto the deodorizing heater 33, and is provided with upper and lower net-shaped members 39a and 39b. The members 39a and 39b are constituted by a heat-resistant material, for example stainless steel wire, and are arranged so that respective node portions of the upper net member 39a vertically confront respective space portions of the lower net member 39b, as indicated by A in FIG. 15. Furthermore, the net-shaped members 39a and 39b are provided with catalyst coated layers 39c and 39d of the same kind as in the deodorizing heater 33 on the surfaces thereof.

Accordingly, the water droplets falling from the cooling coil 26 during the defrosting cycle fall on the net-shaped water droplet prevention member 39 and hit the node portions of the upper net-shaped member 39a so as to be splashed by the impact. On the other hand, the water droplets falling through the space portions of the upper net-shaped member 39a fall onto the node portions of the lower net-shaped member 39b so as to be splashed by the impact. Therefore, no evaporation sound is issued, since the defrosted water droplet does not directly impact the deodorizing heater 33.

Seventh Embodiment

Figure 16:
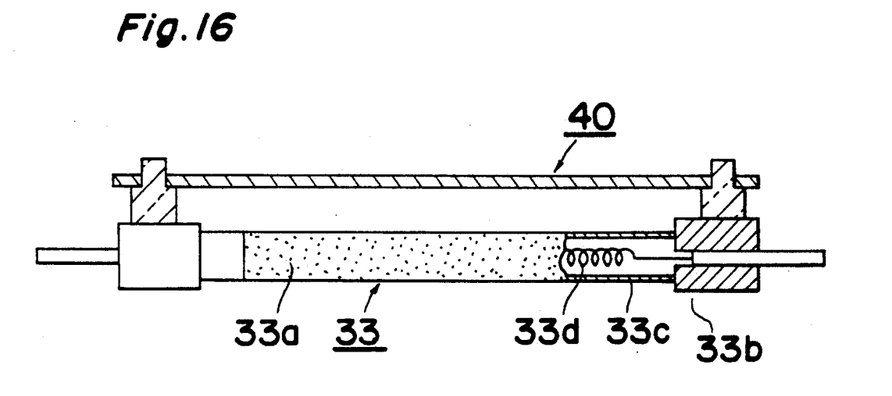
FIGS. 16 and 17 are, respectively an enlarged partially broken side view and an enlarged cross-sectional view of a deodorizing device according to a seventh embodiment of the present invention.
Figure 17:
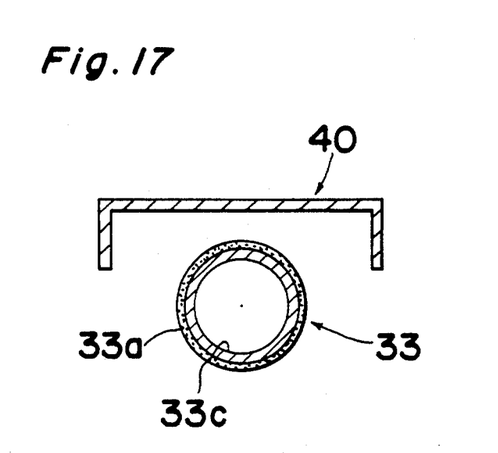

Furthermore, a deodorizing device according to a seventh preferred embodiment of the present invention will be described below with reference to FIGS. 16 and 17. In FIGS. 16 and 17, reference numeral 40 represents a water droplet prevention member of a downwardly opened shallow-bottomed shape comprised of a central cover plate having depending side edges, and is provided so as to cover the deodorizing heater 33 from above to prevent the defrosted water from falling upon the deodorizing heater, and is made of a metal such as heat-resistant and water-resistant aluminum.

In this case, no water droplet falls onto the catalyst coated layer 33a acting as the deodorizing member, since the distance of the water droplet prevention member 40 and the width thereof are determined so that the deodorizing heater 33 is positioned above the path of the refracted falling flow.

In this way, no defrosted water falls on the catalyst coated layer as the deodorizing member, and the freezing break of the catalyst coated layer bearing the deodorizing function can be prevented.

Eight Embodiment

Figure 18:
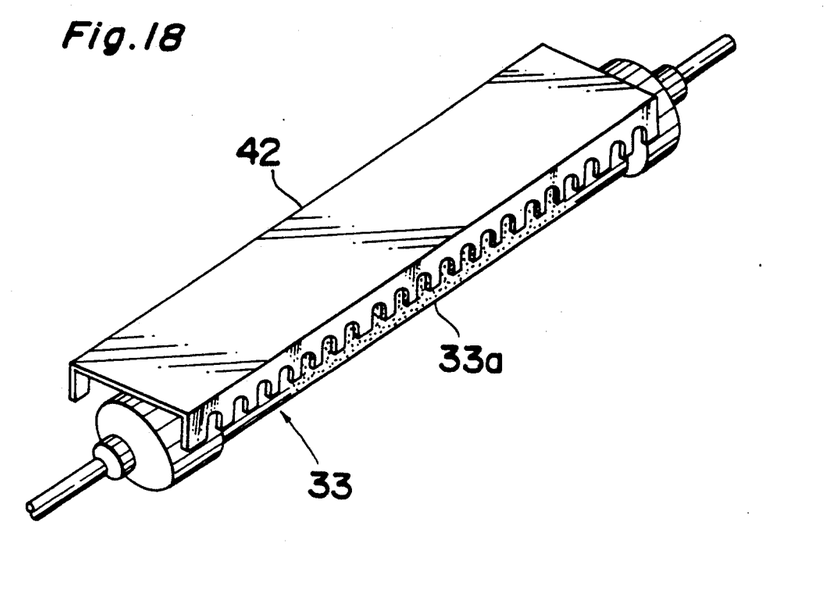
FIGS. 18 and 19 are, respectively a perspective view and an enlarged view of an essential portion of a deodorizing device according to an eighth embodiment of the present invention.
Figure 19:
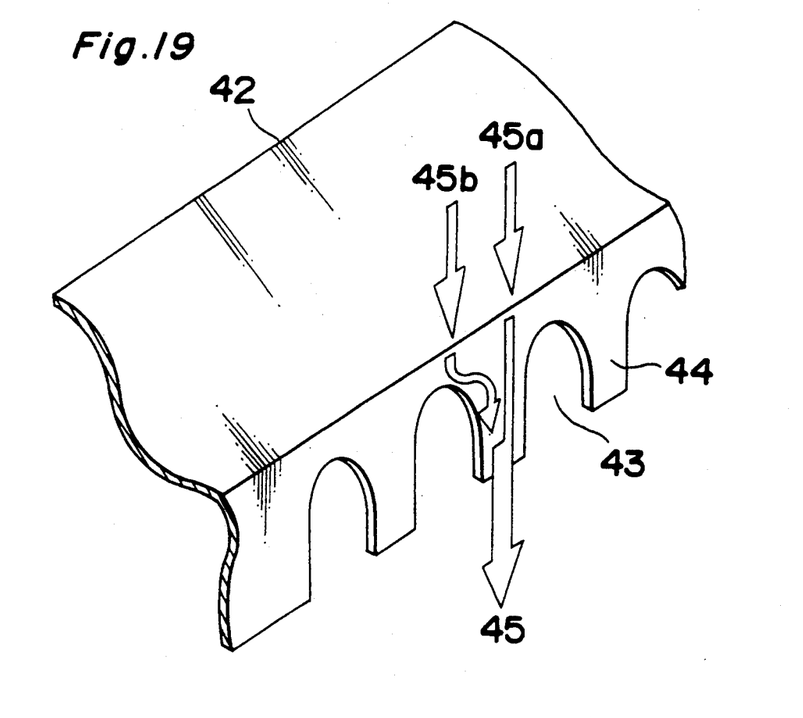

Furthermore, an eighth preferred embodiment of the present invention will be described below with reference to FIGS. 18 and 19. Reference numeral 42 represents a water droplet prevention member of a downwardly opened shape provided so as to cover the deodorizing heater 33 from above to prevent the defrosted water from falling onto the deodorizing heater, and is formed on its lower side surface with a series of notch portions 43 of a width smaller than that matching the water droplet diameter. Reference numeral 44 represents an edge portion formed between respective notch portions so as to have a width smaller than that matching the droplet diameter, and reference numerals 45, 45a, and 45b respectively represent the dropping paths of the defrosted water droplets.

Therefore, among the defrosted water falling from the cooling coil 26 during the defrosting cycle, the defrosted water 45b dropping onto the notched portion 43 does not drop from the upper portion of the notched portion since its width is smaller than the water droplet diameter, but is pulled towards the edge portion 44 by the surface tension. On the other hand, the defrosted water falling on the edge portion 44 is concentrated to the edge portion since its width is smaller than the water droplet diameter. Since both droplets are concentrated to toward the edge portion 44 so as to flow therein, the flow speed is increased and drop downward in a vertical falling flow, without developing the refracted flow due to the surface tension. Thus, no water droplet of the defrosted water is splashed on the deodorizing heater 33 and freezing break of the catalyst coated layer 33a due to the water splash thereon can be prevented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A deodorizing device for a refrigerator, comprising:
   a tubular heater, said tubular heater comprising an electric resistance member therein and having an effective heating portion thereof, said effective heating portion of said tubular heater having an outer periphery that is provided with a catalyst layer coated thereon for absorbing odor components of air circulating in the refrigerator, said catalyst layer comprising active alumina, silica and a platinum group metal; and
   a cover member provided immediately above said tubular heater so as to cover said tubular heater for preventing water droplets deposited from a cooling coil from falling on said tubular heater.

2. The deodorizing device of claim 1, wherein said cover member has an uneven lower surface that is additionally coated with a further catalyst layer.

3. The deodorizing device of claim 1, wherein said uneven lower surface of said cover member comprises a plurality of blades.

4. The deodorizing device of claim 1, wherein said uneven lower surface is serrated in section.

5. The deodorizing device of claim 1, wherein said tubular heater has a fin on said outer periphery of said effective heating portion, said catalyst layer being further coated on the surfaces of said fin.

6. The deodorizing device of claim 5, wherein said fin is in the form of a spiral.

7. The deodorizing device of claim 1, wherein said cover member is in the form of a net, and has a further catalyst layer coated on a surface thereof.

8. The deodorizing device of claim 7, wherein said cover member comprises upper and lower net members, each said net member comprising net node portions and space portions, said net members being arranged so that each said net node portion of one of said net member vertically confronts a said space portion of the other said net member, and both said net members being provided with a further catalyst layer coated on a surface thereof.

9. The deodorizing device of claim 1, wherein said cover member has a pair of side portions having serrated lower edges comprising alternating notch portions and edge portions.

10. The deodorizing device of claim 9, wherein each said edge portion has a width smaller than a water droplet diameter on said cover member.

11. The deodorizing device of claim 1, wherein said tubular heater includes a glass tube having said electric resistance member therein, said glass tube having said catalyst layer thereon.

12. The deodorizing device of claim 1, wherein said cover member is made of metal and comprises a central cover plate having depending side edges.

* * * * *